(No Model.)
A. DERVAUX.
PROCESS OF PURIFYING WATER BY EBULLITION.
No. 584,628. Patented June 15, 1897.
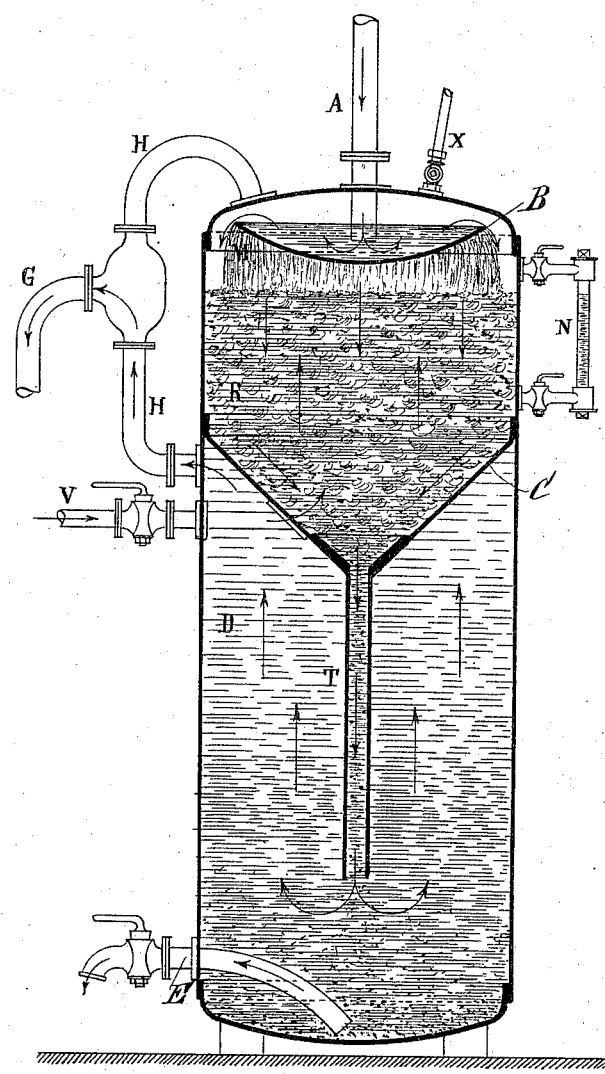
WITNESSES.
INVENTOR:
A. Dervaux.
BY
Munn & Co.
ATTORNEYS

UNITED STATES PATENT OFFICE.

ALFRED DERVAUX, OF BRUSSELS, BELGIUM.

PROCESS OF PURIFYING WATER BY EBULLITION.

SPECIFICATION forming part of Letters Patent No. 584,628, dated June 15, 1897.

Application filed March 17, 1894. Serial No. 503,973. (No specimens.) Patented in France November 18, 1893, No. 232,280; in Germany November 19, 1893, No. 84,660; in Belgium November 20, 1893, No. 107,224; in Austria-Hungary November 21, 1893, No. 63,674 and No. 97,573; in Italy February 16, 1894, No. 35,792/185; in Spain February 16, 1894, Nos. 2,780 and 15,499, and in England February 20, 1894, No. 3,684.

*To all whom it may concern:*

Be it known that I, ALFRED DERVAUX, of Brussels, Belgium, have invented a new and useful Process of Purifying Water by Ebullition, (for which I have obtained patents in Belgium, No. 107,224, dated November 20, 1893; in France, No. 232,280, dated November 18, 1893; in Great Britain, No. 3,684, dated February 20, 1894; in Germany, No. 84,660, dated November 19, 1893; in Austria-Hungary, No. 63,674 and No. 97,573, dated November 21, 1893; in Italy, No. 35,792/185, dated February 16, 1894, and in Spain, Nos. 2,780 and 15,499, dated February 16, 1894,) of which the following is a full, clear, and exact description.

The object of my invention is to purify water and especially to deprive it of any carbonate of lime that may be contained therein.

It is well known that ebullition in eliminating carbonic-acid gas contained in water precipitates the carbonate of lime which is in solution therein as long as the acid is present, but is insoluble by itself.

The most practical process for boiling and thus purifying water consists in injecting steam into the water. I would observe, however, that it is not sufficient to heat the water by simply passing it through steam in the shape of a stream or allowing it to trickle therethrough in the form of drops, but in order to expel the carbonic acid and thus precipitate the carbonate of lime contained in the water it is necessary to boil the water—that is, a mass or continuous body of water must be subjected to the action of steam passing through it and causing the water to bubble. This process, which has been very expensive hitherto, I have improved considerably by the means hereinafter described and claimed, so that the cost of process is now practically reduced to nothing.

Reference is to be had to the accompanying drawing, which is a central sectional elevation of my improved water-purifier.

The apparatus consists of a closed receptacle comprising an upper air or steam chamber M and two water-chambers R and D, respectively.

A is the feed-pipe, through which the water to be purified enters the receptacle, and B is a dished plate located under the feed-pipe, so as to receive the water therefrom, the water then overflowing at the edge of the plate as a sheet or spray, as illustrated by the drawing. The chambers R and D are separated by a conical or funnel-shaped partition C, whose bottom is connected to a tube T, discharging into the lower compartment D. By this arrangement the outflow of the water from the compartment R into the compartment D is retarded.

H is a tube connecting the upper compartment M to the lower compartment D, and G is an outlet-pipe branching off from the tube H at a level below that of the plate B.

V is the inlet-pipe, through which steam may enter the upper water-compartment R.

N is a gage-glass, and X a vent-valve for allowing the carbonic acid to escape when the pressure within the chamber M is greater than atmospheric pressure, as will be presently described.

E is a normally-closed drain-pipe for periodically removing the sediment (carbonate of lime) accumulating at the bottom.

In operation steam is admitted into the chamber R of the receptacle through the pipe V at a suitable constant pressure, any approved form of pressure-regulator being employed, if necessary. The steam enters the compartment R near the bottom, as indicated by arrows, and rises in the descending body of water, causing it to bubble and to boil. The steam finally gets into the empty chamber M, in which it is condensed by the sheet or spray of cold water running from the plate B. This condensation of the steam escaping from water in ebullition in a closed vessel and under a predetermined pressure of steam, (ranging from the high pressure at the boiler from which the steam is supplied to the reduced pressure or vacuum prevailing in a condenser,) which condensation takes place in the upper chamber M, will produce a suction on the steam, thus drawing it from the inlet-tube V through the water contained in the chamber R, which may be termed an "ebullition-chamber." The impure water which passes through the upper chamber M, by condensing the steam rising from the boiling body of water contained in the compartment R, is heated to its boiling-point prior to reaching the said compartment—that is, it is heated to the temperature at which it will boil under the pressure existing in the apparatus. When this condition has been attained, the steam will pass through the boiling water without being condensed and thus will forcibly agitate the water and cause it to boil strongly. The steam also takes along with it into the condensing-chamber M the carbonic-acid gas contained in the water, while the carbonate of lime is precipitated to the bottom. The water then sinks through the tube T to the bottom of the lower compartment D and rises slowly in said compartment without being subjected to any agitation, so that the carbonate of lime can readily settle, while the purified water passes out through the pipe G.

Since the steam is condensed by means of the water to be purified, it follows that the heat of the steam is absorbed by the said water, so that there is practically no loss of heat, and in cases where it is desirable not only to purify but to heat the water (for instance, when the water is to be used for feeding a steam-boiler) it will be obvious that the water will be purified without loss of steam or of heat—that is, at a cost next to nothing.

The apparatus may be used in various manners, and I will now indicate its chief applications. I have already said that the apparatus will operate at any pressure from the high pressure in the boilers to the vacuum of the condenser of a steam-engine.

First. The apparatus may be employed to supply water to steam-boilers, in which case the pressure within the apparatus will be the same as that within the boilers. For this purpose the receptacle is placed at a higher level than the boilers. The feed-water supplied by a pump or an injector enters the apparatus through the tube A. The steam-inlet pipe V is connected to one of the boilers, and the outlet G for the purified water is connected to the feed-water pipe leading to the boilers. The purification of the water takes place in the manner above explained under the variable high temperature and the high pressure prevailing in the boilers. The same pressure will be produced in the steam-chamber M of the apparatus notwithstanding the condensation in said chamber, if the steam-inlet pipe V is made of sufficient cross-sectional area, and this being the case the purified water will flow out of the apparatus by gravity, owing to the difference of the water-level in the purifying-receptacle and in the boilers. Since the pressure within the apparatus is superior to atmospheric pressure, the carbonic-acid gas expelled from the water is allowed to escape to the atmosphere through the vent-cock X. By heating the feed-water in the purifier, using the steam from the boiler to be supplied with water, it will be obvious that the water will be purified at a nominal cost, since the same amount of heat which is employed in purifying the water in the apparatus would have to be expended to heat it to the same temperature in the boiler if it was not intended to heat or purify the water prior to its admission to the boiler.

Second. The apparatus can be employed at any pressure intermediate between boiler-pressure and atmospheric pressure. The impure feed-water, as before described, is supplied through the tube A by means of a reservoir, a pump, or an injector. Steam is admitted through the tube V through the medium of a pressure-reducing valve or regulator, so as to maintain a constant pressure within the apparatus. The purified water leaving the receptacle through the pipe G at a temperature corresponding to said reduced pressure may, if necessary, be cooled by passing it through any suitable device—for instance, through the well-known cooler provided with a coil around which flows the purified water to be cooled, while within said coil flows the cooling-liquid, which may be the water to be purified. Thus the impure water may be heated preparatory to its admission into the purifying-receptacle. By the arrangement described the purified water in case its temperature should be too high for its intended use may be cooled without loss of heat to a temperature but slightly above the initial temperature of the impure water. The pressure within the apparatus being in this case also superior to atmospheric pressure, the carbonic-acid gas expelled from the water and rising into the chamber M is allowed to escape into the atmosphere through the vent-cock X.

Third. The apparatus may operate with a "vacuum"—that is, at a pressure inferior to atmospheric pressure. In this case the condensing-chamber M is connected by means of the tube containing the cock X with the condenser of a steam-engine or with a vacuum-pump, which by suction progressively removes the gases expelled by ebullition, particularly carbonic-acid gas, and maintains within the apparatus a predetermined reduced pressure or vacuum, the ebullition taking place at a correspondingly-reduced temperature. Steam is supplied to the inlet-tube V through the medium of a pressure-regulator of any suitable construction. The purified water is withdrawn from the apparatus by means of a pump connected to the outlet-tube G, and the same pump may have a connection to the tube containing the cock X, so as to remove the gases from the condensing-chamber M. By thus operating the apparatus at a reduced pressure or vacuum water may be purified by ebullition at a temperature of 50° or 60° centigrade.

When operating with a vacuum, the suction which causes the steam to pass through the body of water in the ebullition-chamber R, instead of being produced merely by the condensation of steam in the condensing-chamber M, (through the medium of the water passing through said chamber,) may be effected by means of a condenser, such as the condenser of a steam-engine, connected to the tube containing the cock X, which tube in this case may be made of an enlarged cross-section. Thus when the apparatus is used in conjunction with a condensation steam-engine the exhaust-steam would be conveyed to the inlet-tube G and the condenser would be connected to the tube containing the cock X, so as to produce a suction to draw the exhaust-steam through the body of water contained in the ebullition-chamber R. In a similar manner I may employ the exhaust-steam from a common (atmospheric) exhaust-engine for boiling the water in the apparatus by drawing said steam by suction through the water to be purified, as above set forth.

Having thus described my invention, I claim as new and desire to secure by Letters Patent—

1. The herein-described method of purifying water by ebullition, consisting in introducing steam into a descending column of water at the bottom thereof, and then condensing the steam arising from said column of water, as set forth.

2. The method herein described of purifying water by ebullition, consisting in heating a descending column of water to the boiling-point by introducing steam at the bottom of the column, and then subjecting the steam escaping from the boiling column of water to a spray or sheet of cold water to condense the steam, thereby producing a vacuum above the said column of water and at the same time heating the said spray or sheet of water, whereby the steam will be drawn through the column of water by suction and the water thoroughly boiled and forcibly agitated, as set forth.

3. The herein-described method of purifying water by ebullition, which consists in forming in a closed receptacle a descending column of water, leaving a free space or chamber above said column, heating the water to the boiling-point and at the same time separating the carbonic acid and carbonate of lime therefrom by introducing steam at the bottom of said column, and condensing the steam in said closed receptacle in the free space above the column of water, under a pressure different from atmospheric pressure, by bringing the steam in contact with the water to be purified which is admitted into said chamber and passes through the same before reaching said descending column of water, so that by the condensation of the steam there will be created a suction causing the steam to bubble upward through said descending column of water, substantially as specified.

In testimony that I claim the foregoing as my invention I have signed my name, in presence of two witnesses, this 3d day of March, 1894.

ALFRED DERVAUX.

Witnesses:
 GUSTAVE TIERRY,
 GREGORY PHELAN.